(12) United States Patent
Lerner et al.

(10) Patent No.: US 7,125,463 B2
(45) Date of Patent: Oct. 24, 2006

(54) FLUID FILLED UNIT FORMATION MACHINE AND PROCESS

(75) Inventors: Hershey Lerner, Aurora, OH (US); Dana Liebhart, Streetsboro, OH (US)

(73) Assignee: Automated Packaging Systems, Inc., Streetsboro, OH (US)

( * ) Notice: Subject to any disclaimer, the term of this patent is extended or adjusted under 35 U.S.C. 154(b) by 0 days.

(21) Appl. No.: 11/111,164

(22) Filed: Apr. 21, 2005

(65) Prior Publication Data

US 2005/0188659 A1    Sep. 1, 2005

Related U.S. Application Data

(62) Division of application No. 10/408,947, filed on Apr. 8, 2003, now Pat. No. 6,889,739.

(51) Int. Cl.
*B32B 37/00* (2006.01)

(52) U.S. Cl. .............. 156/145; 156/147; 156/269; 156/292; 156/308.2; 156/309.6; 156/324

(58) Field of Classification Search .......... 156/145, 156/147, 269, 292, 308.2, 309.6, 324
See application file for complete search history.

(56) References Cited

U.S. PATENT DOCUMENTS

| | | |
|---|---|---|
| 3,389,534 A | 6/1968 | Pendleton |
| 3,414,140 A | 12/1968 | Feldkamp |
| 3,462,027 A | 8/1969 | Puckhaber |
| 3,523,055 A | 8/1970 | Lemelson |
| 3,575,757 A | 4/1971 | Smith |
| 3,660,189 A | 5/1972 | Troy |
| 3,667,593 A | 6/1972 | Pendleton |
| 3,813,845 A | 6/1974 | Weikert |
| 3,817,803 A | 6/1974 | Horsky |
| 3,938,298 A | 2/1976 | Luhman et al. |
| 3,941,306 A | 3/1976 | Weikert |
| 4,017,351 A | 4/1977 | Larson et al. |
| 4,021,283 A | 5/1977 | Weikert |
| 4,096,306 A * | 6/1978 | Larson .................. 428/192 |
| 4,169,002 A | 9/1979 | Larson |
| 5,351,828 A | 10/1994 | Becker et al. |
| 5,454,642 A | 10/1995 | DeLuca |
| 5,651,237 A | 7/1997 | DeLuca |
| 5,755,328 A | 5/1998 | DeLuca |

(Continued)

*Primary Examiner*—Jeff H. Aftergut
(74) *Attorney, Agent, or Firm*—Calfee, Halter & Griswold LLP

(57) ABSTRACT

A machine for the manufacture of inflated plastic dunnage and other fluid filled units is disclosed. In a disclosed and pictured dunnage embodiment, the machine includes a hollow shaft rotatably mounted on a frame. In the preferred embodiment the shaft is solid. With either embodiment a drive is operably connected to the shaft for causing the shaft to rotate about its axis and a drum mounted on the shaft to rotate with the shaft. The drum is in the form of a pair of closely spaced discs having perimetral, cylindrically contoured sealing surfaces for support and, in cooperation with driven metal belts, transport of a web being formed into dunnage units. Sets of heating and cooling shoes having spaced arcuate surfaces are complementally positioned adjacent the drum surfaces with the cooling shoes downstream from the heating shoes in the direction of dunnage formation rotation. A nozzle is mounted generally tangentially of the drum at a location midway between the discs. Each of the cooling shoes includes an air expansion chamber communicating through a shoe inlet when in use with a supply of air under pressure. In the hollow shaft embodiment one cooling shoe chamber has an outlet in communication with the nozzle via the shaft.

3 Claims, 7 Drawing Sheets

U.S. PATENT DOCUMENTS 5,824,392 A    10/1998  Gotoh et al.
6,209,286 B1 *  4/2001  Perkins et al. ................ 53/403
6,410,119 B1    6/2002  De Luca et al.
6,460,313 B1   10/2002  Cooper
6,761,960 B1    7/2004  De Luca et al.

* cited by examiner

FLUID FILLED UNIT FORMATION MACHINE AND PROCESS

CROSS-REFERENCE TO RELATED APPLICATIONS

This is a Divisional of U.S. patent application Ser. No. 10/408,947 filed Apr. 8, 2003 for FLUID FILLED UNIT FORMATION MACHINE AND PROCESS, now U.S. Pat. No. 6,889,739.

FIELD OF INVENTION

This invention relates to a novel machine and process for producing dunnage and other fluid filled units with a novel web.

BACKGROUND OF THE INVENTION

U.S. Pats. Re 36,501 reissued Jan. 18, 2000 and RE 36,759 reissued Jul. 4, 2000 respectively entitled "Method for Producing Inflated Dunnage" and "Inflated Dunnage and Method for its Production" and based on original patents respectively issued Sep. 3, 1996 and Dec. 2, 1997 to Gregory A. Hoover et al. (the Hoover Patents) disclose a method for producing dunnage utilizing preopened bags on a roll. The preopened bags utilized in the Hoover patents are of a type disclose in U.S. Pat. No. 3,254,828 issued Jun. 2, 1966 to Hershey Lerner and entitled "Flexible Container Strips" (the Autobag Patent). The preferred bags of the Hoover patents are unique in that the so called tack of outer bag surfaces is greater than the tack of the inner surfaces to facilitate bag opening while producing dunnage units which stick to one another when in use.

U.S. Pat. No. 6,199,349 issued Mar. 13, 2001 under the title Dunnage Material and Process (the Lerner Patent) discloses a chain of interconnected plastic pouches which are fed along a path of travel to a fill and seal station. As each pouch is positioned at the fill station the pouches are sequentially opened by directing a flow of air through a pouch fill opening to open and then fill the pouch. Each filled pouch is then sealed to create an hermetically closed, inflated dunnage unit. Improvements on the pouches of the Lerner Patent are disclose in copending applications Ser. No. 09/735,345 filed Dec. 12, 2000 and Ser. No. 09/979,256 filed Nov. 21, 2001 and respectively is entitled Dunnage Inflation (the Lerner Applications). The system of the Lerner Patent and Applications is not suitable for packaging liquids. Moreover, since the production of dunnage units by the process described is relatively slow, an accumulator is desirable. An improved accumulator and dispenser for receiving dunnage units manufactured by a dunnage unit formation machine is disclose in U.S. application Ser. No. 09/735,111 filed Dec. 12, 2000 by Rick S. Wehrmann under the title Apparatus and Process for Dispensing Dunnage.

Accordingly, it would be desirable to provide an improved system for filling pouches with fluid to produce dunnage or liquid filled units at high rates of speed.

SUMMARY OF THE INVENTION

The machine and process of the present invention provide enhanced production of dunnage units similar to those produced by the systems of the Lerner Patent and Applications but at greatly improved production rates. Unlike those systems, the machine and process of the present invention are also capable of producing liquid filled units. Specifically, a novel and improved unit formation machine is disclosed. The machine includes a rotatable drum having a spaced pair of cylindrically contoured surfaces. An elongated nozzle extends generally tangentially between and from the cylindrical surfaces. In use, the nozzle is inserted into a novel web at a transversely centered position as the web is fed upwardly and around the drum. The web is described and claimed in a concurrently filed application Ser. No. 10/408,946 by Hershey Lerner. As the web passes over the nozzle, web pouches are filled with fluid and the web is separated into two chains of filled pouches as the nozzle assembly separates the web along longitudinal lines of weakness.

A plurality of heat shoes are provided. Each heat shoe has a spaced pair of arcuate web engaging surfaces which are complemental with the cylindrical drum surfaces. Downstream from the heat shoes in the direction of web travel, a plurality of cooling shoes \are provided. The cooling shoes like the heating shoes have pairs of arcuate surfaces which are complemental with the drum's cylindrical surfaces. The shoes are effective to clamp a pair of metal transport belts against the web and in turn the web against the rotating drum as spaced sets of seals are formed. The seals complete fluid filled pouches and convert the filled pouches into dunnage or liquid filled units. The units are separated following their exit from the last of the cooling shoes.

Tests of dunnage manufacture have shown that with pouches having four inch square external dimensions, dunnage units are produced at the rate of eight cubic feet per minute. This contrasts sharply with the machine of the Lerner Patents which produces dunnage units at the rate of three cubic feet per minute. Indeed the system of the present invention produces dunnage units on demand at rates sufficiently fast to obviate the need for a device such as that taught in The Dispenser Patent.

One of features of a dunnage only embodiment of the machine of the present invention is the novel and efficient way in which it utilizes air under pressure. Pressurized air is fed to chambers within the cooling shoes where it is allowed to expand. As the air expands in the cooling shoe chambers, it absorbs heat, enabling the shoes effectively to freeze seals of dunnage units being formed.

The drum in the disclosed embodiments is in fact a slightly spaced pair of disks mounted on a driven and rotatable shaft. In the dunnage only embodiment the drum shaft is tubular. Air exhausted from the cooling shoes is fed to the tubular shaft and thence through an axially centered shaft outlet to a connected nozzle. Air supplied to the nozzle further expands as the pouches are inflated. The result is even though the air expands as pouches are inflated, the air within the pouches is warmer than ambient. As the air within the pouches, and thus the dunnage units being formed reaches equilibrium with the ambient temperature, pressure within the units will decrease sufficiently to assure that the finished dunnage units, while solidly filled, are filled at controlled pressure low enough to minimize the potential for rupture when compressed in use.

Accordingly the objects of the invention are to provide a novel and improved dunnage formation machine and process of formation of fluid filled units.

DETAILED DESCRIPTION OF THE PREFERRED EMBODIMENT

While the following description describes a dunnage formation system, it should be recognized the preferred embodiment of the machine is sterilzable so that beverages such as water and fruit juice may be packaged using the novel web, machine and process.

Figure 1:
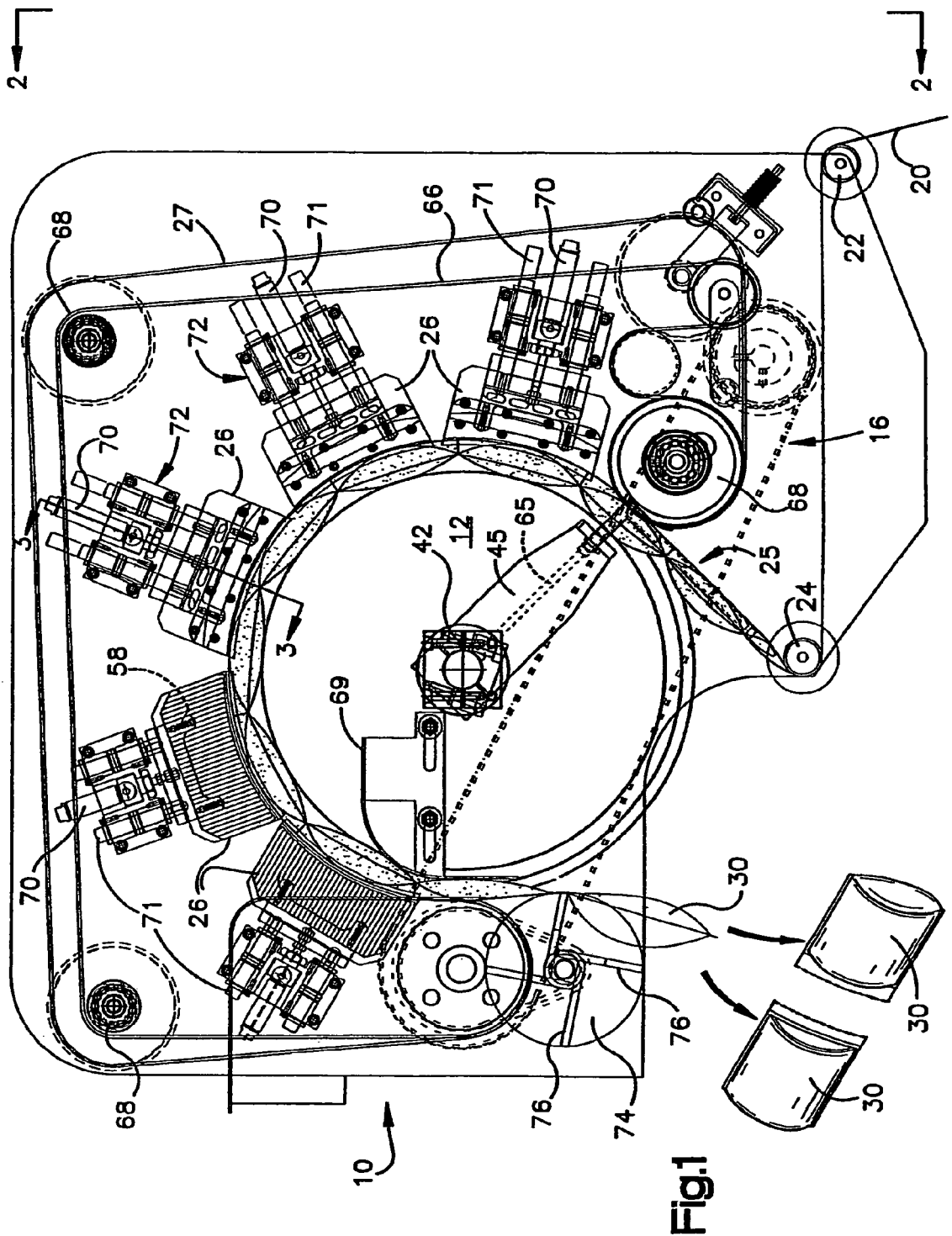
FIG. 1 is an elevational view of the unit formation machine of the present invention.
Figure 2:
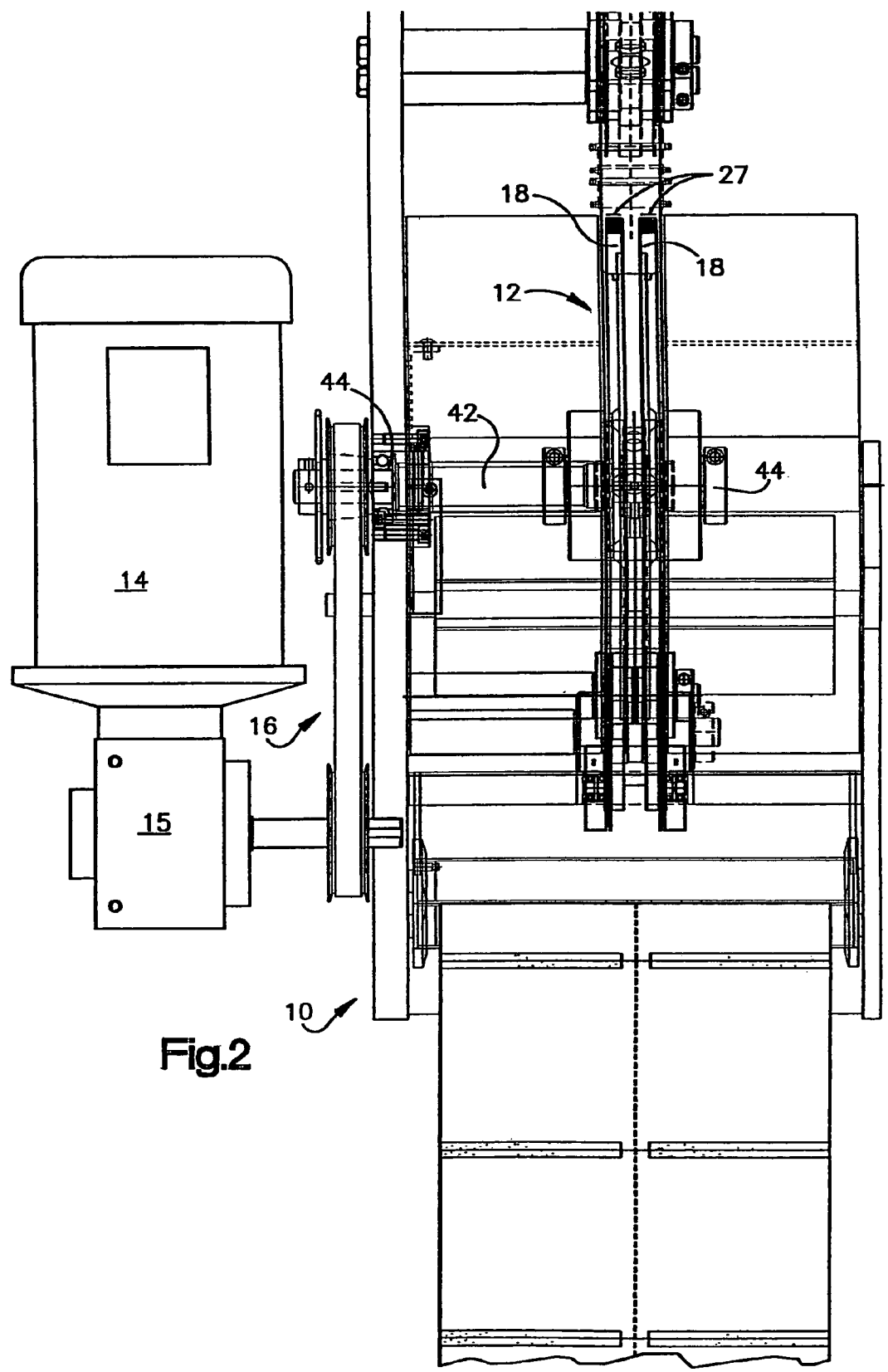
FIG. 2 is a plan view of the machine of FIG. 1 as seen from the plane indicated by the line 2—2 of FIG. 1 showing a web being fed into the machine.

Referring now to the drawings and FIGS. 1 and 2 in particular, a dunnage formation machine is shown generally at 10. The machine includes a rotatable drum 12 which is driven by a motor 14 via a gear box 15 and a belt and pulley arrangement 16, FIG. 2. In the preferred and disclose arrangement, the drum is comprised of spaced annular disks 18.

When the machine is in use a web 20 is fed from a supply, not shown. As is best seen in FIG. 1, the web 20 passes over a guide roll 22 and thence under a guide roll 24 to an inflation station 25. The web 20 is fed around the disks 18 to pass under, in the disclose embodiment, three heat shoes 26 which shoes heat metal transport belts 27 to seal layers of the web. The heat softened web portions and the transport belts then pass under cooling shoes 28 which freeze the seals being formed. As the now inflated and sealed web passes from the cooling shoes individual dunnage units 30 are dispensed.

In practice the machine 10 will be housed within a cabinet which is not shown for clarity of illustration. The cabinet includes access doors with an electrical interlock. When the doors are open the machine may be jogged for set up, but the machine will not operate to produce dunnage units unless the doors are closed and latched.

The Web

Referring now to FIGS. 5–9, the novel and improved web for forming dunnage units is disclose. The web is formed of a heat sealable plastic such as polyethylene. The web includes superposed top and bottom layers connected together at spaced side edges 32. Each of the side edges is a selected one of a fold or a seal such that the superposed layers are hermetically connected along the side edges 32.

Figure 6:
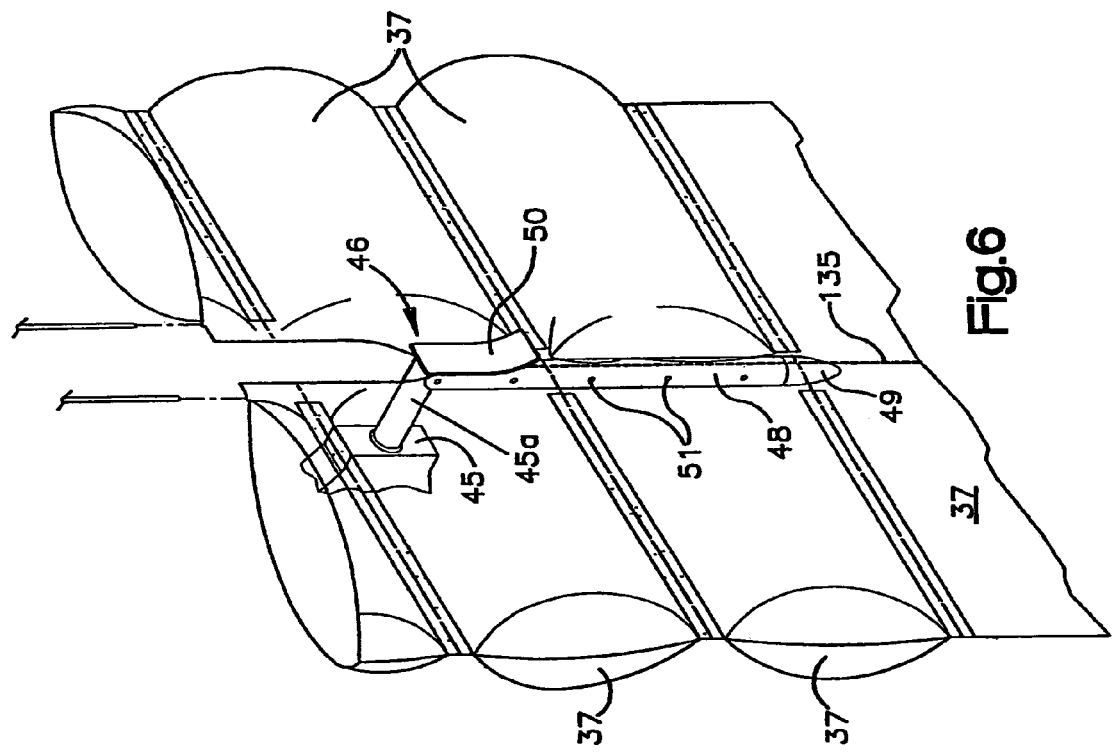
FIG. 6 is a perspective view showing a section of a web as the web pouches are inflated and the web is separated into parallel rows of inflated pouches.
Figure 5:
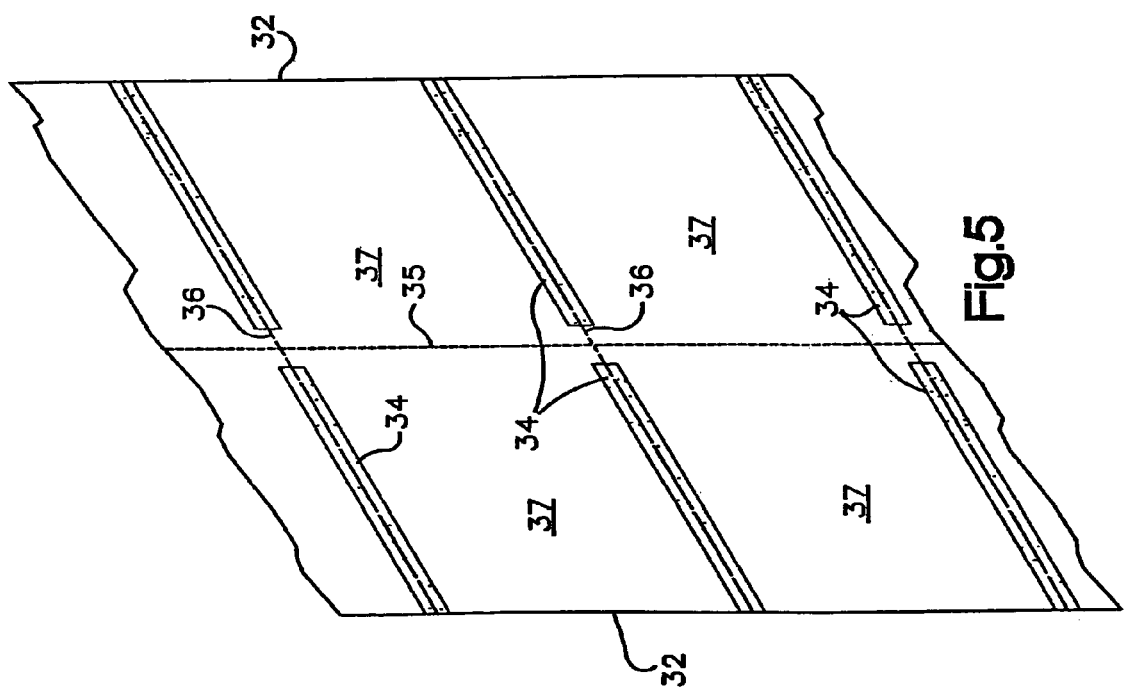
FIG. 5 is a perspective view of a section of the novel and improved web.
Figure 7:
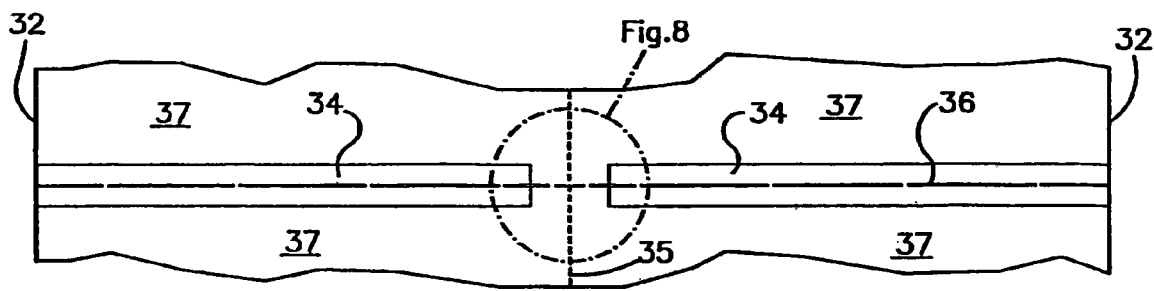
FIG. 7 is an enlarged plan view of a portion of the web including a transverse pair of heat seals.

A plurality of transverse seal pairs 34 are provided. As best seen in FIGS. 5–7, each transverse seal extends from an associated side edge 32 toward a longitudinally extending pair of lines of weakness 35. The longitudinal lines of weakness 35 are superposed one over the other in the top and bottom layers of the web and are located midway between the side edges. Each transverse seal 34 terminates in spaced relationship with the longitudinal lines of weakness which preferably are in the form of uniform, small perforations. The transverse seal pairs 34 together with the side edges 32 delineate two chains of centrally open side connected, inflatable pouches 37.

Figure 8:
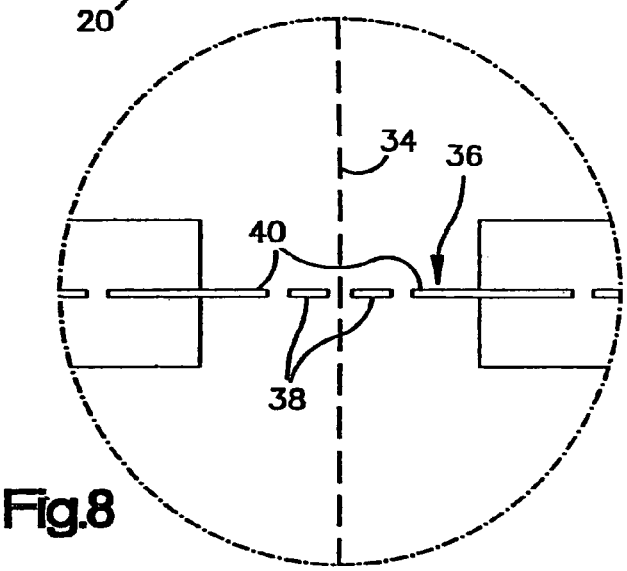
FIG. 8 is a further enlarged fragmentary view of a central part of the web as located by the circle in FIG. 7.
Figure 9:
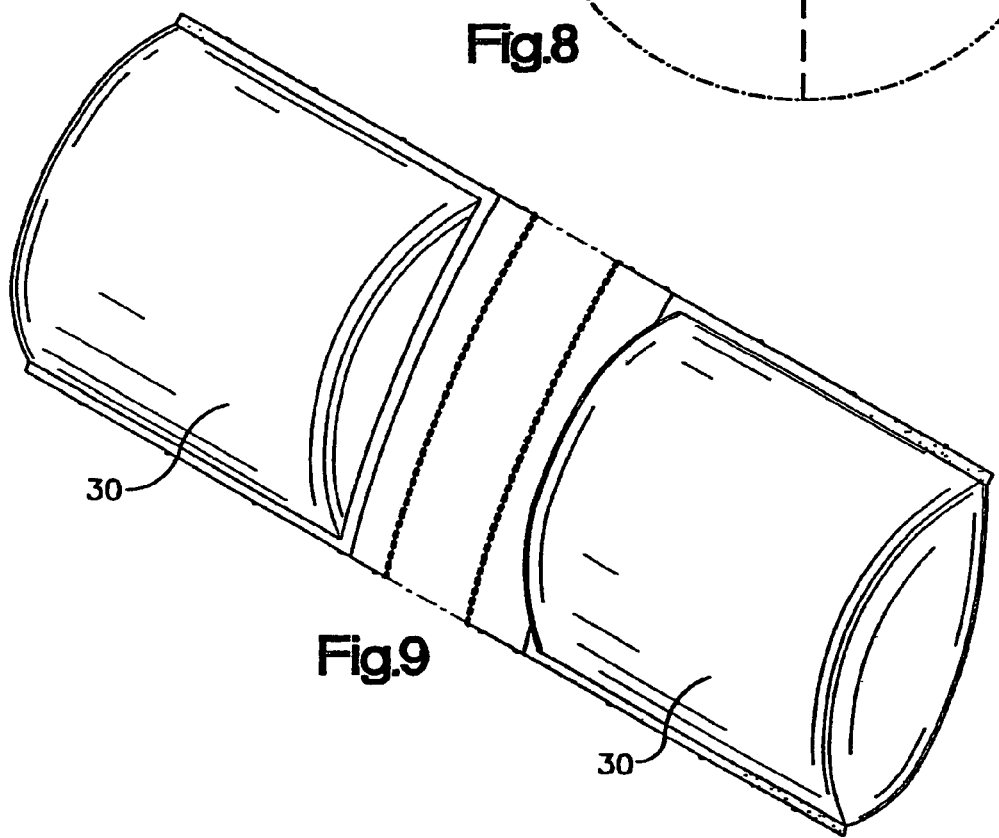
FIG. 9 is a perspective view showing a pair of completed fluid filled units following separation and as they exit the machine; and, FIG. 10 is an enlarged view of a preferred support embodiment and a shoe which arrangement is for supporting the shoes in their use positions and for moving them to out of the way positions for machine set up and service.

As is best seen in FIGS. 7 and 8, transverse lines of weakness 36 are provided. The pouches are separable along the transverse lines 36. Like the longitudinal lines of weakness 35 the transverse lines are preferably perforations but in contrast to the to the longitudinal line perforations each has substantial length. The perforations of the transverse lines 36, in a further contrast with the perforations of the longitudinal lines 35, are not of uniform dimension longitudinally of the lines. Rather, as is best seen in FIG. 8, a pair of small or short perforations 38 is provided in each line. The small perforations 38 of each pair are disposed on opposite sides of and closely spaced from the longitudinal lines 34. Each transverse line of weakness also includes a pair of intermediate length perforations 40 which are spaced and positioned on opposite sides of the small perforations 38. The intermediate perforations extend from unsealed portions of the superposed layers into the respective seals of the associated transverse seal pair. The remaining perforations of each line are longer than the intermediate perforations 40.

The Machine

In the embodiment of FIG. 1, the disks 18 are mounted on a tubular shaft 42. The shaft 42 is journaled at 44 for rotation driven by the belt and pulley arrangement 16. The shaft 42 carries a stationary, tubular, nozzle support 45 which extends from around the shaft 42 radially outwardly. A nozzle assembly 46 is carried by a support arm 45A, FIG. 6. The nozzle assembly 46 includes an inflation nozzle 48. As is best seen in FIG. 6, the nozzle 48 is an elongated tube with a closed, generally conical, lead end portion 49. The nozzle 48 when in use extends into the web at a central location transversely speaking. The web transverse lines of weakness are spaced slightly more than a one half the circumference of the nozzle so that the web layers fit closely around the nozzle to minimize leakage of air exiting side passages 51 of the nozzle to inflate the pouches 37.

The nozzle assembly 46 includes a web retainer 50 which guides the web against the nozzle 48. The retainer also functions to cause the web to be longitudinally split along the longitudinal lines of weakness 35 into two strips of inflated pouches.

Figure 3A:
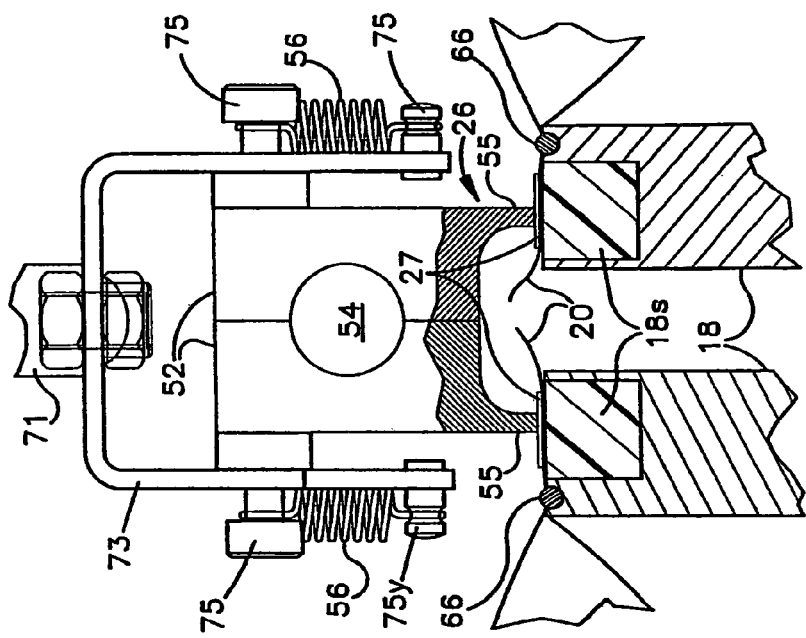
FIG. 3a is a further enlarged view of the shoe and the drum as seen from the same plane as FIG. 3.
Figure 3:
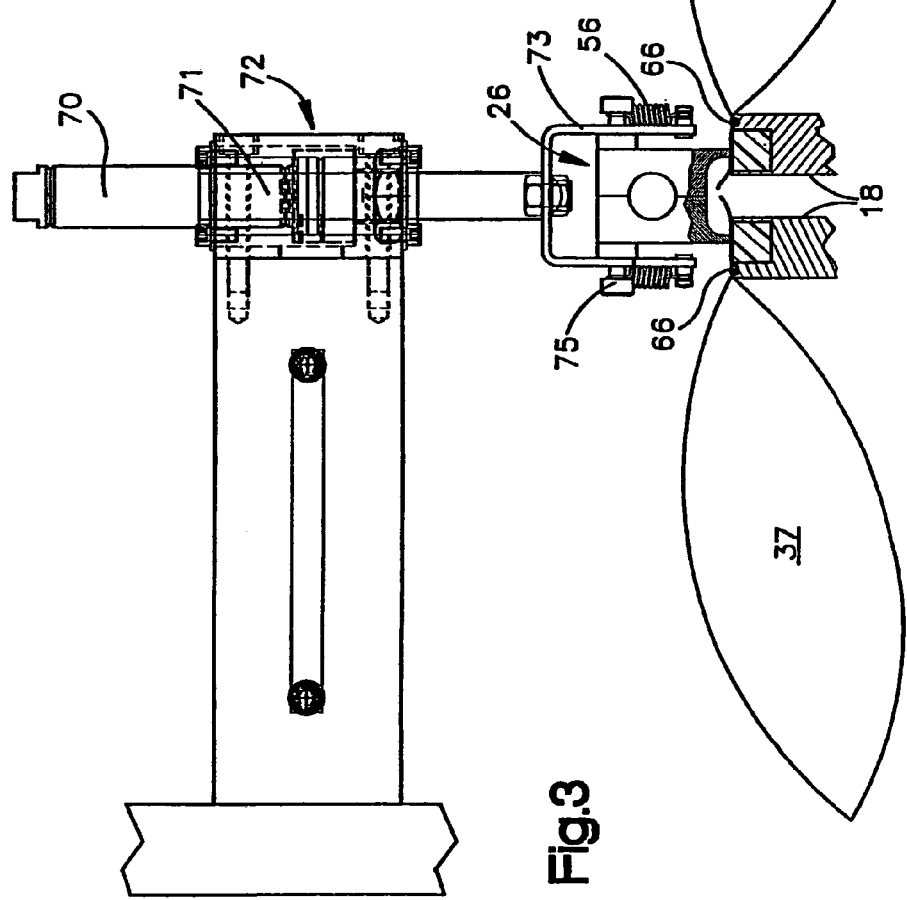
FIG. 3 is an enlarged sectional view of a heat shoe and a portion of the drum as seen from the plane indicated by the line 3—3 of FIG. 1.

As is best seen in FIGS. 3 and 3A, each of the heat shoes 26 has a mirror image pair of heat conductive bodies 52. The bodies 52 together define a cylindrical aperture 54, which houses a heating element, not shown. Each heat body 52 includes a seal leg 55 having an arcuate surface substantially complemental with a cylindrical surface of an associated one of the disks 18. In the disclose embodiment the disk surfaces are defined by thermally conductive silicone rubber inserts 18s, FIG. 3A. In the embodiment of FIGS. 3 and 3A, springs 56 bias the legs 55 against the transport belts 27 as the web passes under the heat shoes due to rotation of the drum 12 and its disks 18. The cooling shoes 38 are mounted identically to the heat shoes.

Figure 4:
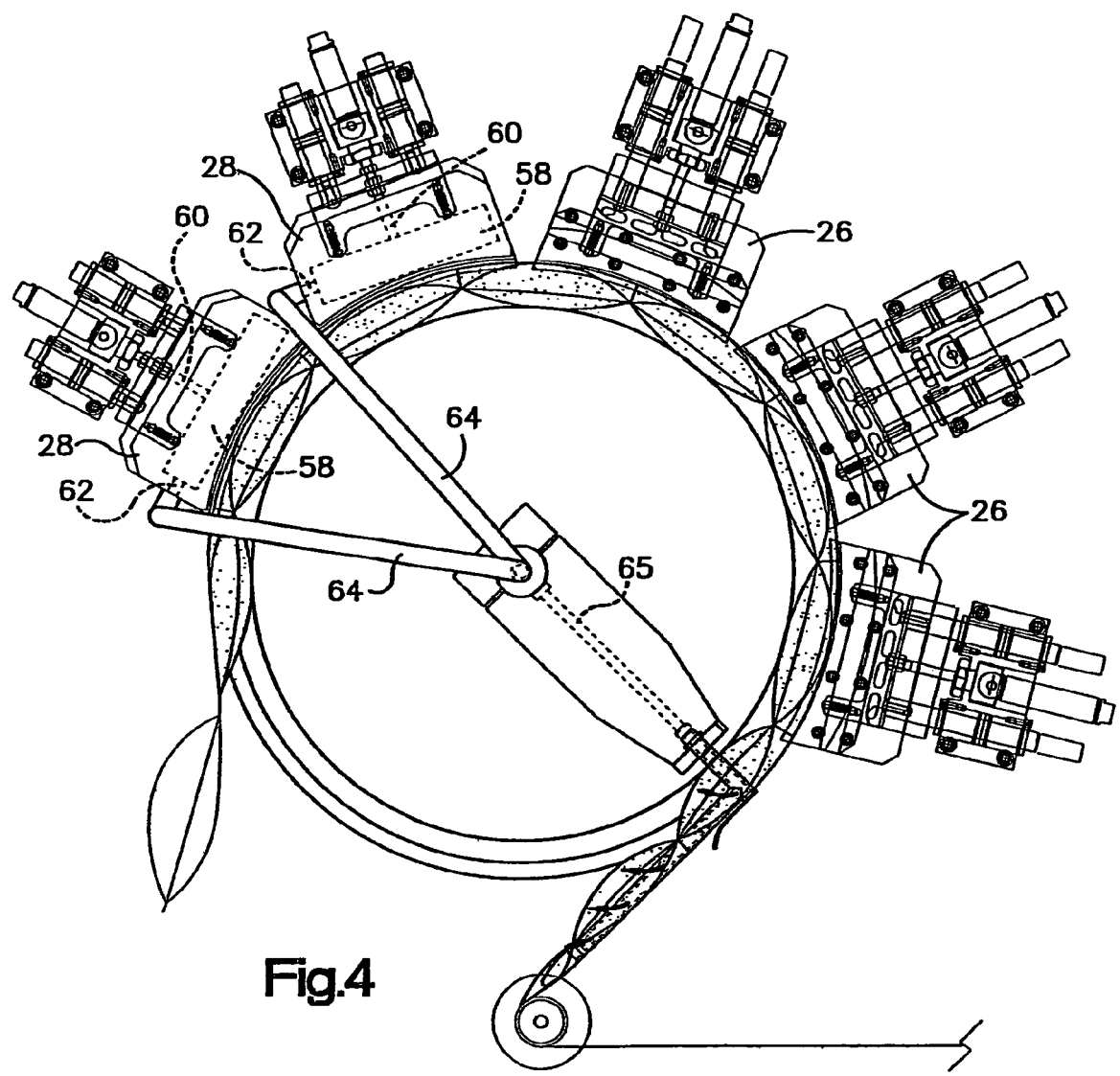
FIG. 4 is a view showing a dunnage embodiment of the machine with components which delineate a air flow path from a supply to and through the cooling shoes and then the inflation nozzle.

Each cooling shoe 28 includes an expansion chamber 58, FIG. 4. An air supply, not shown, is connected to a chamber inlet 60. Air under pressure is fed through the inlet 60 into the chamber 58 where the air expands absorbing heat and thus cooling the shoe. Exhaust air from the chamber passes through an exit 62. Cooling shoe legs 63 are biased against the web to freeze the heat softened plastic and complete seals.

In the embodiment of FIGS. 1–4 cooling shoe exhaust air then passes through a conduit 64 to the tubular shaft 42. Air from the cooling shoes is fed via the conduit 64 and the shaft 42 to a passage 65 in the nozzle support 45. The passage 65 is connected to the nozzle 48. Thus air from the cooling shoes is directed to and through the nozzle 48 and the exit passages 51 into the pouches.

Figure 10:
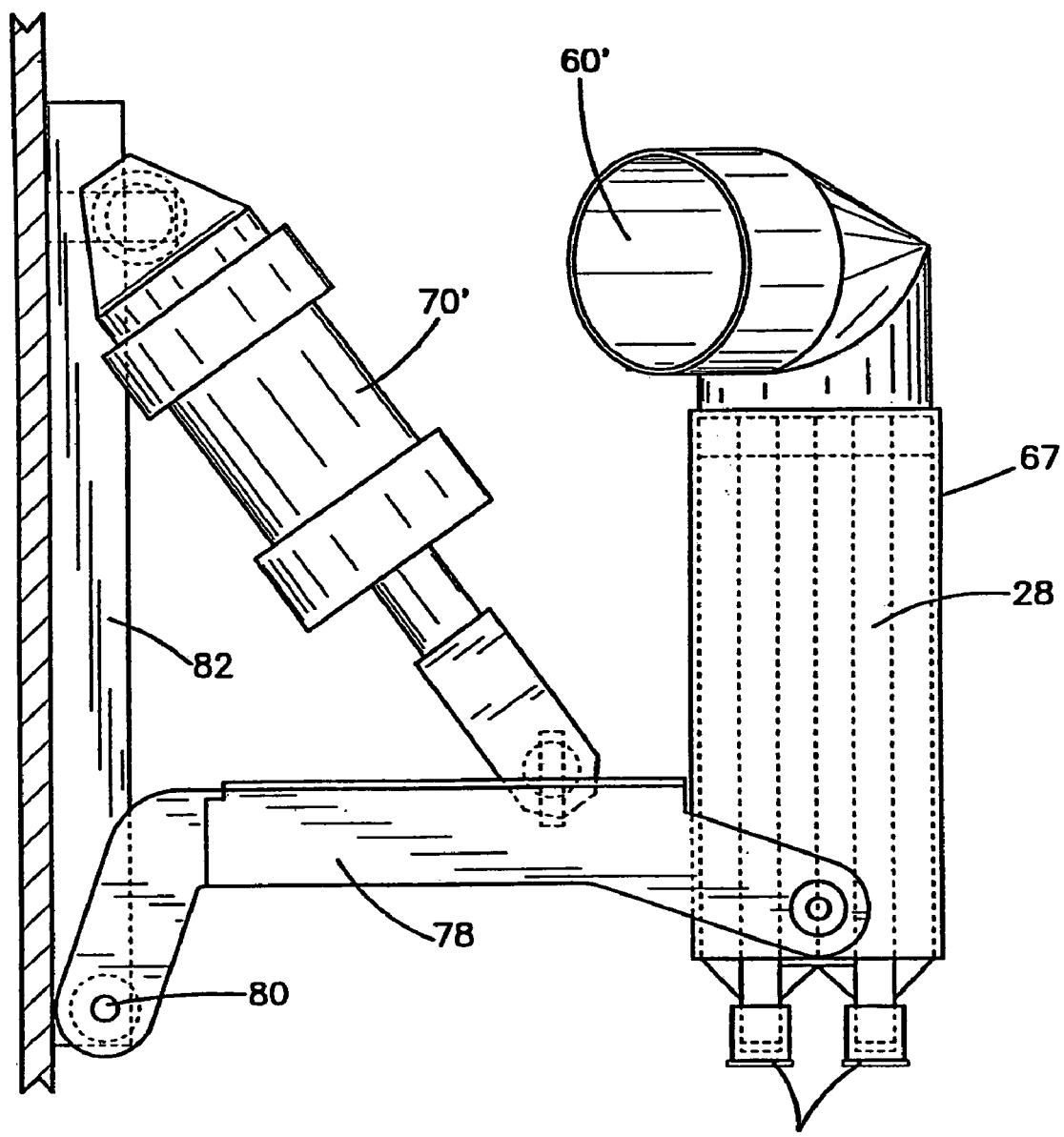

With the now preferred and sterilizable embodiment, cooling shoes 28' as shown in FIG. 10 are employed has a jacket 67 which surrounds a body having cooling fins shown in dotted lines in FIG. 10. An inlet 60' is provided at the top of the jacket. Air flowing from the inlet passes over the fins cooling them and the exits from the bottom of the jacket. Each of the shoes 28' is vented to atmosphere through an outlet 67. The nozzle 48 is directly connected to a supply of fluid under pressure and the shaft 42 may be made of solid material.

A pair of hold down belts 66 are mounted on a set of pulleys 68. The belts 66 are reeved around a major portion of the disks 18. As is best seen in FIGS. 3 and 3A, the belts 66 function to clamp portions of the web 20 against the disks on opposite sides of the shoe legs 55. While test have shown that the machine is fully operable without the belts 66, they are optionally provided to isolate pressurized air in the inflated pouches 37 from the heating and cooling shoes. A fixed separator 69 is provided. As the inflated pouches approach the exit from the downstream cooling shoe the fixed separator functions to cam them radially outwardly sequentially to separate each dunnage unit from the next trailing unit along the connecting transverse line of weakness except for a small portion under the transport belts 27.

A separator wheel 74 is provided, FIG. 1. The wheel 74 is rotated clockwise as seen in FIG. 1 such that arms 76 are effective to engage completed dunnage units 30 sequentially to complete the separation of each dunnage unit from the web along its trailing transverse line of weakness 36. Thus, the separator wheel is effective to tear the last small connection of each pouch which was under an associated one of the transport belts as the pouch was substantially separated by the fixed separator 69.

In the embodiment of FIG. 1, each of the shoes 26, 28 is mounted on an associated radially disposed shaft 71. Clamping arrangements shown generally at 72 are provided to fix each of the shafts 71 in an adjusted position radially of and relative to the drum 12. As is best seen in FIG. 3, each shaft 71 carries a yoke 73. The springs 56 span between yoke pins 75 and shoe pins 75 to bias the shoes against a web 20. A cylinder 70 is provided for elevating a connected yoke and shoe for machine set up and service.

In the now preferred embodiment of FIG. 10, each shoe is pivotally mounted on an arm 78. The arm is also pivotally mounted at 80 on a frame 82. A cylinder 70' spans between the arm and the frame for elevating the connected shoe for set up and service and for urging the shoes 28 into their operating positions. The heat shoes 26 are, in the now preferred arrangement, identically mounted.

Operation

In operation, the shoes are elevated by energizing the cylinders 70 of FIGS. 1 and 4 or 70' of FIG. 10. A web 20 is fed along a path of travel over the guide roll 22 and under the guide roll 24 and thence threaded over the inflation nozzle 48. The web is then fed under the transport belts and the retainer 50. As the machine is jogged to feed the web around the discs 18 and the heating and cooling shoes 26,28 the web is split by the nozzle support 55. The split of the web is along the longitudinal line of weakness but the transverse lines of weakness remain intact at this time. Thus, the web portions at opposite ends of the small perforations 38 are of sufficient size and strength to avoid a longitudinal split of the web as the web is fed over the nozzle. Since the transverse seals of each pair are spaced only very slightly more than one half the circumference of the nozzle the web closely surrounds the nozzle to minimize air leakage when the pouches are inflated.

Next the heating and cooling shoes are elevated by actuating either the cylinders 70 or 70'. The web is then fed sequentially, and one at a time, under the heating shoes 26 and the cooling shoes 28. Since the web has been split by the nozzle support 55, there are in fact two parallel paths of travel each with an associated transport belt 27 and chain of side connected and inflated pouches.

Once the web has been fed around the drum to an exit location near the separator wheel 74 and the machine has been jogged until the operator is satisfied the feed is complete and the machine is ready, the heat shoe elements will be energized. Air will be supplied to the cooling shoes 28 and the nozzle 48. Next the motor 14 will be energized to commence machine operation.

As we have suggested, one of the outstanding features of the invention is that the web closely surrounds and slides along the nozzle. The close surrounding is assured by the transverse seals being spaced a distance substantially equal to one half the circumference of the nozzle 48. Thus, the two web layers together delineate a nozzle receiving space which will closely surround an inserted nozzle. As the web advances the pouches 37 on opposed sides of the nozzle will be filled efficiently by fluid under pressure exiting the nozzle passages 51 in opposed streams. Where dunnage units are being formed the fluid will be air. The web is then split by the nozzle support into two chains of side connected and fluid filled pouches respectively traveling along associated ones of the two paths of travel.

Each of the chains is fed under spaced legs 55 of the heating shoes 26 to effect heat seals. As the web passes under cooling shoe legs 63 the seals are frozen and the pouches are separated along most of the length of transverse lines of weakness by the separator. Facile separation is assured by the long perforations because the remaining connections of the web across the transverse seals are short in transverse dimension and few in number.

When the pouches exit the last of the cooling shoes, they have been formed into finished dunnage units 30. The finished units 30 are sequentially completely separated from the web by the arms 76 of the separation wheel 74.

While the system as disclosed and described in the detailed description is directed to dunnage, again, as previously indicated, units filled with fluids other than air such as water and fruit juices can be produced with the same machine, process and web.

Although the invention has been described in its preferred form with a certain degree of particularity, it is understood that the present disclosure of the preferred form has been made only by way of example and that numerous changes in the details of construction, operation and the combination and arrangement of parts may be resorted to without departing from the spirit and the scope of the invention as hereinafter claimed.

We claim:

1. A process of forming fluid filled units comprising:
    a) feeding a web having a series of side connected pouches that are each connected to an adjacent pouch by a line of perforations from a supply to a fill station, wherein first perforations of the line of perforations that extend from an inflation opening of each pouch are shorter than second perforations of the line of perforations that extend from the first perforations toward a side edge of each pouch;
    b) fluid filling the pouches as the web is fed through the fill station by directing fluid under pressure through a nozzle into the web pouches;
    c) maintaining the web in close surrounding relationship with the nozzle during the filling step to limit the loss of fluid under pressure from the web; and,
    d) sealing the pouches to form filled units by engaging the web with belts and passing engaged web portions under coacting heating and cooling shoes.

2. The process of claim 1 wherein there are spaced pairs of side connected pouches and the pouches of each pair are concurrently formed into dunnage units.

3. The process of claim 1 wherein there are spaced pairs of side connected pouches and the pouches of each pair are concurrently formed into units.

* * * * *